United States Patent
Buergel et al.

(10) Patent No.: US 8,252,376 B2
(45) Date of Patent: Aug. 28, 2012

(54) METHOD FOR RESTORING THE MICROSTRUCTURE OF A TEXTURED ARTICLE AND FOR REFURBISHING A GAS TURBINE BLADE OR VANE

(75) Inventors: Ralf Buergel, Melle (DE); Winfried Esser, Bochum (DE); Stefan Krause, Maasbree (NL); Michael Ott, Mülheim (DE); Der-Yan Frank Roan, Maitland, FL (US)

(73) Assignee: Siemens Aktiengesellschaft, München (DE)

( * ) Notice: Subject to any disclaimer, the term of this patent is extended or adjusted under 35 U.S.C. 154(b) by 2199 days.

(21) Appl. No.: 10/786,349

(22) Filed: Feb. 25, 2004

(65) Prior Publication Data
US 2004/0216813 A1 Nov. 4, 2004

Related U.S. Application Data

(63) Continuation-in-part of application No. 10/133,861, filed on Apr. 26, 2002, now Pat. No. 6,719,853.

(60) Provisional application No. 60/286,662, filed on Apr. 27, 2001.

(51) Int. Cl.
*C23C 16/00* (2006.01)
(52) U.S. Cl. ...................................................... 427/250
(58) Field of Classification Search .................. 428/678
See application file for complete search history.

(56) References Cited

U.S. PATENT DOCUMENTS

| | | | | |
|---|---|---|---|---|
| 4,878,953 A | * | 11/1989 | Saltzman et al. | 148/512 |
| 4,933,239 A | * | 6/1990 | Olson et al. | 428/557 |
| 6,500,283 B1 | * | 12/2002 | Schaeffer et al. | 148/522 |
| 2003/0091755 A1 | * | 5/2003 | Kashirin et al. | 427/600 |

FOREIGN PATENT DOCUMENTS

| | | | |
|---|---|---|---|
| EP | 186797 A1 | * | 7/1986 |
| EP | 525545 A1 | * | 2/1993 |

* cited by examiner

*Primary Examiner* — Michael Cleveland
*Assistant Examiner* — Michael G Miller

(57) ABSTRACT

During a solution heat treatment grain recrystallization may occur of a textured article, especially at the surface rim.
The present invention provides a method for restoring the microstructure of a textured article, which comprises coating the surface of the article with a high temperature stable surface coating or by a controlled development of an oxide scale and subsequently performing a solution heat treatment, thereby maintaining said thermally stable surface coating.

22 Claims, 4 Drawing Sheets

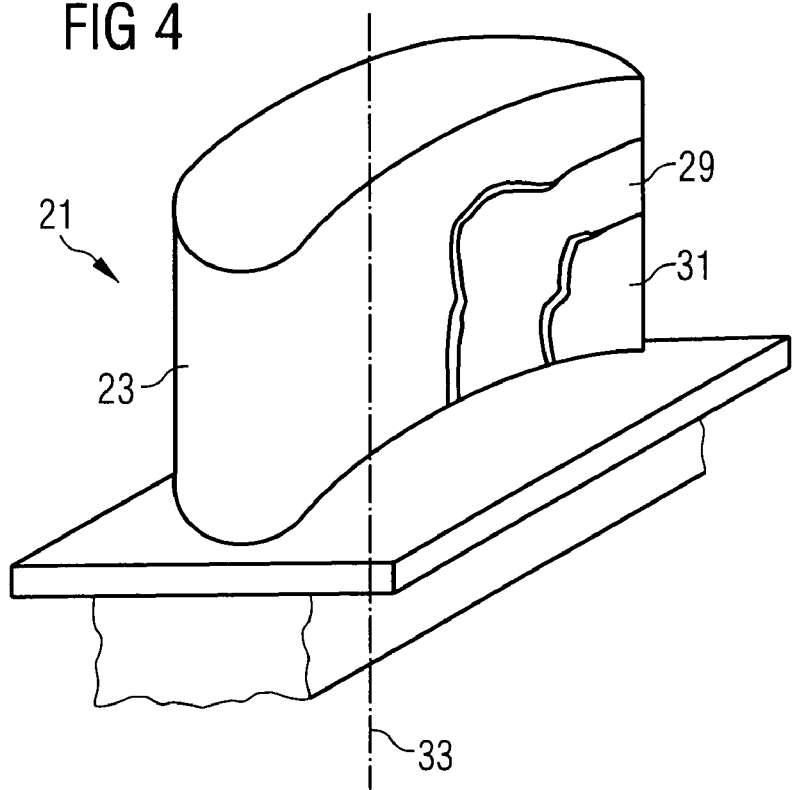

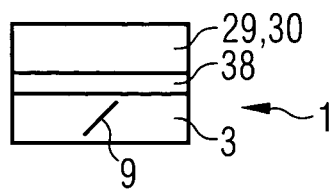
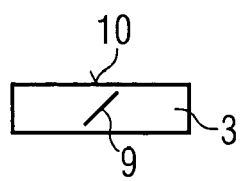
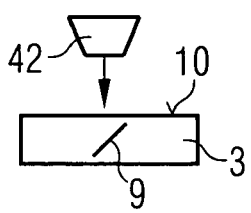 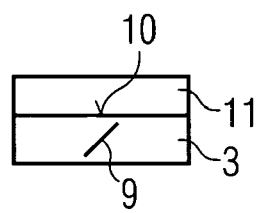
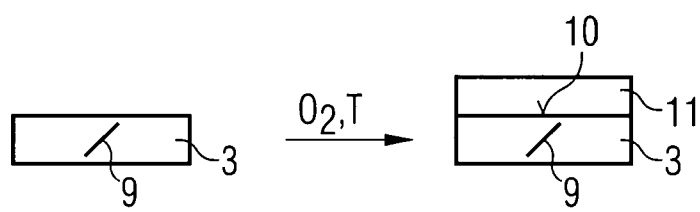
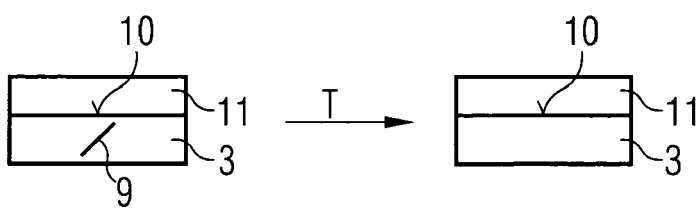
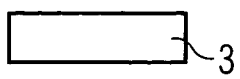 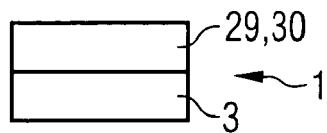

METHOD FOR RESTORING THE MICROSTRUCTURE OF A TEXTURED ARTICLE AND FOR REFURBISHING A GAS TURBINE BLADE OR VANE

CROSS REFERENCE TO RELATED APPLICATIONS

This application is a continuation-in-part application of U.S. patent application Ser. No. 10/133,861, filed Apr. 26, 2002, now U.S. Pat. No. 6,719,853 which claims the priority of U.S. provisional application No. 60/286,662, filed Apr. 27, 2001. Each of the above referenced applications are incorporated by reference herein by their entirety.

FIELD OF THE INVENTION

The present invention relates to textured articles and in particular to the restoration of the microstructure of textured articles. The invention is further related to the field of refurbishment and repair of gas turbine airfoils.

BACKGROUND OF THE INVENTION

U.S. Pat. No. 5,611,670 shows a gas turbine moving blade made of a nickel based superalloy. Superalloys are nickel- or cobalt-based alloys, typically comprising chromium, titanium, tantalum, aluminum, tungsten and other elements, with excellent high temperature resistance, thereby maintaining high strength properties. Accordingly, superalloys are widely used in high temperature applications where additionally high mechanical strength is required. A typical application is the casting of airfoils for gas turbines, jet engines as well as stationary gas turbines, e.g. for industrial applications like power generation. Further improvements in mechanical strength is achieved by casting the superalloy as a columnar or as a single crystal. A textured article has no or very few grain boundaries.

European Patent Application EP 1 038 982 A1 describes a process for manufacturing single crystal superalloy articles. After casting the article is subjected to a heat treatment in order to further improve the mechanical strength. The heat treatment is a high temperature solution heat treatment which homogenizes the microstructure of the alloy itself formed by different crystal phases. However, this heat treatment may lead to a grain recrystallization process, initiated by dislocations in the crystal structure. This grain recrystallization destroys locally the single crystal structure which may lead to a dramatic decrease in the mechanical strength of the article. Accordingly, grain recrystallization is a cause for rejection of single crystal castings if present beyond a preset maximum for recrystallized grains and can result in quite low yields of acceptable heat-treated single crystal castings. By heat treating in a carburizing atmosphere, carbon is introduced into the casting and forms carbides therein that reduce or localize grain recrystallization.

European Patent EP 0 525 545 B1 describes the refurbishment of corroded superalloy articles. In particular gas turbine airfoils are subjected to corrosion by hot gases. Typically, a corrosion protective coating is provided on the body made from the superalloy. Widely used are coatings of the type MCrAlY, where M is iron, cobalt and/or nickel, and Y stands for yttrium or another rare earth element or another element such as lanthanum. This type of coating is usually provided by a plasma spray process. However, despite a corrosion protective coating, the airfoils are still under corrosion and erosion attack which leads to the need for servicing after a certain time period. Corrosion results from contaminants in the fuel and/or air; furthermore, oxidation may also occur at high temperatures. Depending on the conditions of operation, an oxide layer of varying thickness may form on the surface of the airfoil. Also, and very significantly, sulfur can penetrate into the base material to form sulfides. Also, internal oxides and nitrides may form within the metal near the surface. Instead of completely exchanging airfoils, it is often a cost saving option to refurbish the airfoils, i.e. providing a new protective coating. This requires complete removal of the old coating, which is realized by applying mechanical stripping as well as chemical treatment, e.g. with acid. After removal of a substantial part of the old coating, the surface is aluminized. Subsequently, the aluminide layer is removed, thereby also removing oxidized and corroded regions at the surface.

The U.S. Pat. No. 5,413,648 discloses a directionally solidified article with a plastic deformation damage at the surface, which is prone to recrystallization. This problem is overcome by removing a part of the deformed surface region.

The EP 1 036 850 A1 discloses a single crystal having a surface coating for preventing recrystallization fracture by reinforcing the grain boundaries. After a heat treatment the texture of the article at the surface shows no single crystal structure anymore, because the surface has grain boundaries, which are reinforced by grain boundary strengthening elements like Zr, Hf, B or C.

The U.S. Pat. No. 6,271,668 shows the need of a coating during one step of refurbishment of gas turbine components, which is applied on the surface of the component, which is heat treated with this coating by which a surface region of the article is aluminized. This heat treatment is performed at low temperatures in order to avoid detrimental diffusion of atoms from corrosion products.

The coating is removed together with the corroded layers before further heat treatments are performed.

U.S. Pat. No. 6,024,792 has disclosed a process for build-up welding. During the build-up welding, a laser beam or electron beam is used to melt powder and allow directional solidification thereof, so that the region which has undergone build-up welding has a directionally solidified structure like the underlying substrate.

SUMMARY OF THE INVENTION

The present invention provides a method for restoring or adjusting the microstructure of a textured article, e.g. a single crystal or a directionally solidified article, which comprises creating on the surface of the article a high temperature stable surface coating and subsequently performing a solution heat treatment, thereby maintaining said thermally stable surface coating.

As set out above, grain recrystallization may occur during a solution heat treatment of the article. The invention underlies the discovery that grain recrystallization occurs at lower temperatures at the surface of an article compared to bulk regions. The energy needed for forming new grains with grain boundaries is lower at the surface. By applying a coating on the surface and maintaining this surface coating during the solution heat treatment, grain recrystallization is suppressed due to now provided bulk conditions. Accordingly, an effective solution heat treatment can be processed, thereby restoring the microstructure of the textured article without introducing grain recrystallization. A full description of the effect of suppressing grain recrystallization by surface coating was given in the publication "Recrystallization In Single Crystals Of Nickel Base Superalloys", R. Bürgel, P. D. Portella, J. Preuhs, Superalloys 2000, edited by T. M. Pollock, pages 229-238, the teaching of which is incorporated herein by reference, in particular with respect to the alloy compositions disclosed in table I (balance Ni) and heat treatment parameters in table II.

|         | Cr   | Co | Mo  | W   | Ta  | Nb | Al  | Ti  | C   | Hf  |
|---------|------|----|-----|-----|-----|----|-----|-----|-----|-----|
| CMSX-11B| 12.5 | 7  | .5  | 5   | 5   | .1 | 3.6 | 4.2 | —   | .04 |
| PWA 1483| 12.2 | 9  | 1.9 | 3.8 | 5   | —  | 3.6 | 4.1 | .07 | —   |
| SRR 99  | 8.5  | 5  | —   | 9.5 | 2.8 | —  | 5.5 | 2.2 | 0.2 | —   |
| CMSX-6  | 10   | 5  | 3   | —   | 2   | —  | 4.8 | 4.7 | —   | .08 |

TABLE II

| CMSX-11B | solutioning, SHT* | 1204° C./2 h + 1227° C.2/h + 1249° C./3 h + 1260° C./6 h; heating with 1 K/min |
|---|---|---|
|  | age hdn. | 1120° C./5 h + 870° C./24 h + 760° C./30 h |
| PWA 1483 | solutioning* | 1260° C./1 h |
|  | age hdn. | 1090° C./4 h |
| SRR 99 | solutioning* | 1270° C./0.5 h + 1280° C./1 h + 1290° C./2 h + 1300° C./0.5 h + 1305° C.0,5 h; heating with 1 K/min |
|  | age hdn. | 1080° C./4 h + 870° C./16 h |
| 3CMSX-6 | solutioning* | 1227° C./2 h + 1238° C./2 h + 1271° C./2 h + 1277° C./3 h + 1280° C./2 h; heating with 1 K/min |
|  | age hdn. | 1080° C./4 h + 870° C./16 h |

*SHT: Solution heat treatment. Additional steps at lower temperatures may precede the solutioning to equilibrate the furnace.

The article is preferably made from a superalloy, which may be nickel-based or cobalt-based. The microstructure in such a nickel-based superalloy is formed by a γ-phase and a γ'-phase. The temperature required for solution heat treatment is considerably high and is at least the solution temperature of the γ'-phase. By maintaining such a temperature during the solution heat treatment, an effective restoring or adjustment of the microstructure is achieved. This high temperature normally increases the risk of recrystallization. This risk is substantially reduced by applying the surface coating before performing the solution heat treatment. The temperature of the solution heat treatment is preferably above 11000 C, more preferred above 11500 C and even more preferred above 12000 C.

Preferably, the article is a gas turbine blade or vane. The rejection rate of textured castings because of grain recrystallization is in particular high for gas turbine blades because very high mechanical stresses resulting from centrifugal forces require high mechanical strength which is strongly influenced and decreased by grain recrystallization. Moreover thermal fatigue cracking of blades or vanes may start from non-textured areas.

Preferably, the surface coating is an aluminide coating, which is preferably placed on the surface by a Chemical Vapor Deposition (CVD) process, which is well known in the art, e.g. for aluminizing articles for establishing corrosion resistance.

Some preferred composition of the surface coating with its main components are listed here (weight prozent):

Ni: 24%, Cr: 17%, Al: 45%,
Ni: 49%, Cr: 4%, Al: 37%,
Ni: 49%, Cr: 7%, Al: 35%.

The Al-content should be at least 2 wt % for an aluminide coating.

The surface coating could also be for instance an oxide film, e.g. developed by oxidation of the surface of the article, e.g.: alumina, NiO, chromoxide or mixtures of it.

The oxidation of the article can be performed in air or in certain atmospheres with a given oxygen partial pressure in a pretreatment leading to an oxide coating and then performing a solution heat treatment. The oxidation of the article can also be performed in one step during heat-up of the solution heat treatment. First an atmosphere suitable for oxidation is present and after oxidation has occurred a vacuum is applied in order not to oxidise the blade material too much.

Nevertheless the whole solution heat treatment can also be performed in a controlled oxidizing atmosphere.

The oxidation of the surface is especially useful, if the article shows a plastic deformation of the surface, e.g. by strong grinding or other mechanical surface work such as shot peening or high internal stresses due to repair-welding.

Nevertheless a thermally stable oxide layer can be applied to the surface by plasma spraying without oxidation of the surface of the article.

The invention is in particular useful for the refurbishment of a gas turbine blade. The invention provides a method for refurbishing a gas turbine blade made from a textured superalloy body coated with a protective coating and comprising the following subsequent steps:

Coating the protective coating with a high temperature stable surface coating;
performing a solution heat treatment of the superalloy, thereby maintaining the thermally stable surface coating;
removing jointly the surface coating and the protective coating and finally providing a new protective coating on the body for the next engine operation period.

This refurbishment not only includes the recoating of a protective coating system but also includes a solution heat treatment for re-establishing the full mechanical strength properties of the textured structure. Since the gas turbine blade was already subjected to erosion and corrosion attack, plastic deformations in the surface rim are likely to occur. As mentioned above, those plastic deformations are a source of grain recrystallization. Accordingly, in the past, the refurbishment did not include full solution heat treatment of the gas turbine blade because grain recrystallization would have occurred. The heat treatment had to be restricted to a lower temperature heat treatment for bonding the new protective coating. Restoring of the microstructure was not or not completely possible with such a treatment.

Now, a solution heat treatment can be performed without recrystallization because the surface coating or the oxide film also covers areas where the old protective coating is eroded and establishes bulk conditions for the gas turbine blade body which leads to a higher temperature threshold for grain recrystallization.

Depending on the actual condition of the old protective coating, the following method can be applied instead of the above-mentioned method. The following subsequent steps are performed, achieving the same advantages mentioned above:

removing the protective coating;
coating the surface of the gas turbine blade or vane with a high temperature stable surface coating;
subsequently performing a solution heat treatment, thereby maintaining the thermally stable surface coating;
removing the surface coating and
providing a new protective coating on the body.

The invention is explained in greater detail below and by reference to exemplary embodiments shown in the drawings wherein like numerals refer to equivalent elements.

BRIEF DESCRIPTION OF THE DRAWINGS

FIG. 4 shows a gas turbine blade.
FIG. 5 to 11 show several steps of an embodiment of the inventive method.

DESCRIPTION OF THE PREFERRED EMBODIMENTS

The present invention involves heat treating single crystal or directionally solidified articles made from a nickel-based superalloy.

Figure 1:
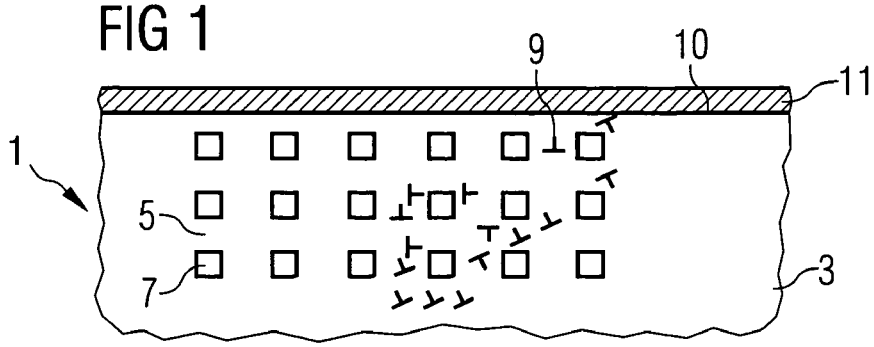
FIG. 1 shows a schematic view of the microstructure of a superalloy.

A schematic view of a single crystal article 1 made from a nickel-based alloy is shown in FIG. 1.

The article has a body 3. According to the single crystal structure, no grain boundaries are present.

Figure 2:
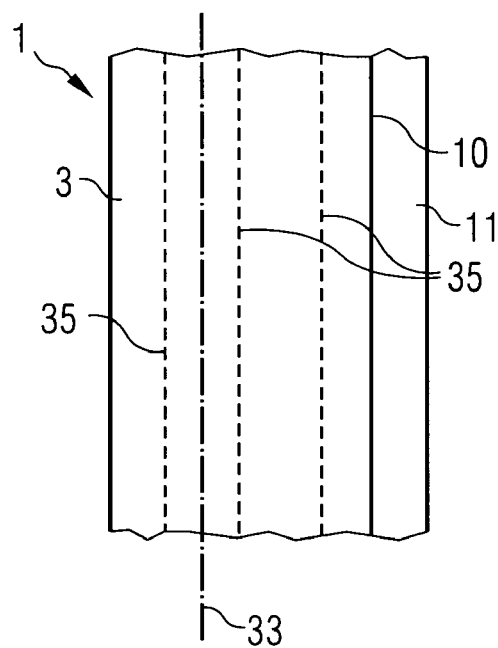
FIG. 2 shows another schematic view of the microstructure of a superalloy.

In the case of directionally solidified articles (FIG. 2) there are grain boundaries 35 only along the z-axis 33. The z-axis is e.g. a radial direction of a turbine blade when in use in a gas turbine. The grain boundaries extend mainly along dotted lines along the z-axis 33.

However, the alloy has a texture formed by mainly two crystal phases 5,7. The first phase 5 is a γ-phase, the second phase is a γ'-phase, both crystal structures are well known to those skilled in the art.

The body 3 has a surface 10 on which a surface coating 11 can be deposited e.g. by a Chemical Vapor Deposition (CVD) process with a CVD coating apparatus. The surface coating 11 can be an aluminide coating.

Further shown is a lattice defect 9, i.e. a dislocation.

Such lattice defects may be caused from mechanical impact on the surface. The mechanical strength of the alloy is influenced by the homogeneity of the microstructure.

Therefore, a solution heat treatment is applied to the article which means holding a high temperature for a certain time, e.g. 1 to 5 hours. For an efficient solution heat treatment, the temperature has to be at least the solution temperature of the γ'-phase 7. By applying this solution heat treatment, a restoration of the microstructure is established.

However, prior art solution heat treatment had as a consequence a significant risk of introducing grain recrystallization. This means that areas, i.e. grains, with different lattice orientations develop. Accordingly, grain boundaries are formed which lower the mechanical strength. When a certain depth or amount of recrystallization is exceeded, the article has to be rejected.

Figure 3:
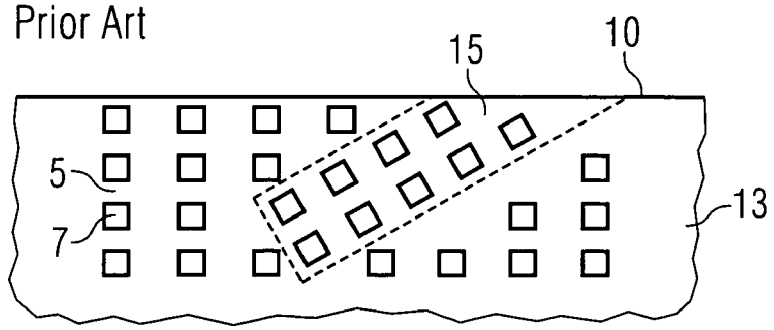
FIG. 3 shows a further schematic view of the microstructure of a superalloy.

FIG. 3 illustrates this recrystallization. A new grain 15 is developed by growth into the original grain 13. A high dislocation concentration 9 as shown in FIG. 1 is the source for the recrystallization.

As a discovery underlying the invention, the occurrence of recrystallization can be suppressed by the surface coating 11. The energy for developing new grains and thereby storing energy in the grain boundaries is higher in the bulk as compared to the surface. The coating 11 implements bulk conditions at the surface 10, thereby increasing the threshold temperature for recrystallization. Accordingly, a solution heat treatment without recrystallization can be performed.

The surface coating 11 can also be generated by oxidation during a heat treatment in air or in a atmosphere with an oxygen partial pressure. The surface coating 11 is generated from the material of a surface rim of the article 1.

A gas turbine blade 21 made from a single crystal nickel-based superalloy is shown in FIG. 4. The body 23 of the blade 21 is coated with a corrosion protective coating 29. On the protective coating 29, a thermal barrier coating 31 is placed. After a certain time period of operation, the blade 23 needs to be refurbished because the coating system is at least partially worn off by oxidation, corrosion and erosion.

The thermal barrier coating 31 and/or the protective coating 29 is removed by chemical and/or mechanical stripping, e.g. by grinding. During this procedure of mechanical stripping often a surface damaged surface rim is generated, usually with a depth of 20 μm from the surface.

The surface coating 11 is deposited on the remainder of the protective coating 29, thereby closing the complete surface of the body 23. Subsequently the solution heat treatment is applied, as described above. After the heat treatment, the surface coating 11, the protective coating 29 and the thermal barrier coating 31 are removed by mechanical stripping and chemical treatment and a new protective coating as well as a new thermal barrier coating are provided.

As another possibility, the protective coating 29 and the thermal barrier coating 31 could be first removed, than the surface coating deposited and the solution heat treatment performed. Subsequently, a new protective coating as well as a new thermal barrier coating are provided.

FIGS. 5 to 11 show schematically the steps of restoring the microstructure of a textured article and/or the refurbishing of a textured article.

FIG. 5 shows the article 1 with the body 3 having a dislocation accumulation 9. On the body 3 there is e.g. a layer 38 with corrosion products on which the protective layer 29 and thermal barrier coating 30 is laying.

In a first step of the inventive method the protective layer 29, the thermal barrier coating 30 and the corrosion products in the layer 38 are removed (FIG. 6).

Secondly, on the surface 10 of the body 3 the surface coating 11 is applied by a coating apparatus 42 (FIG. 7). Different kinds of coating apparatus or processes can be used.

The surface coating 11 can also be applied by oxidising the body 3 at higher temperatures HT (FIG. 8) in an atmosphere with oxygen $O_2$.

The article with the surface coating 11 according to FIG. 7, 8 is now applied to a solution heat treatment as indicated in FIG. 9. The thermal stable surface coating 11 is maintained during the hole solution heat treatment.

FIG. 10 shows the article 1 with his body 3 after the solution head treatment and removal of the surface coating 11. No grain boundary inside the single crystal or no additional grain boundary inside the directionally solidified article 1, especially in the surface rim is present.

A new protective layer 29 and a new thermal barrier coating 30 can now be applied again on the body 3 of the article 1 (FIG. 11).

Figure 12:
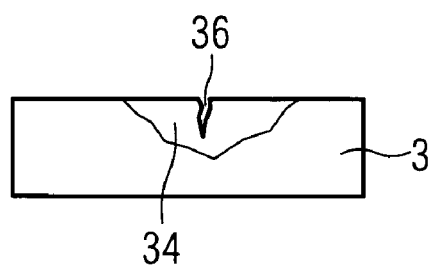
FIG. 12 shows an application of the inventive method.

FIG. 12 shows a further application example of the method of the invention.

The substrate 3 may have a crack 36 or relatively large regions 34 comprising defective material. However, for the substrate 3 to be reused, it is necessary for the crack 36 or the regions 34 comprising defective material no longer to be present.

This is achieved, for example, by soldering up the crack 36 or by removing a region 34 which surrounds the crack 36. The region 34 is, for example, built up by build-up welding, resulting in a newly built-up region 39.

The surface layer 11 may also extend over these newly built-up regions 39 (FIG. 13) in which new material has been newly added, for example by build-up welding or in which a crack 36 has been filled with solder or weld metal.

Figure 13:
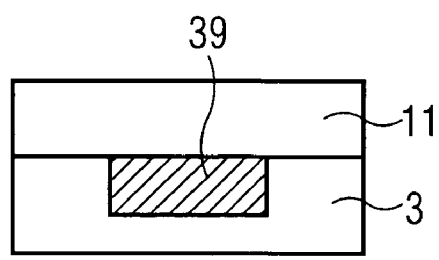
FIG. 13 shows a further application of the inventive method.

The solution heat treatment or another heat treatment which will lead to recrystalization is then carried out using a component as shown in FIG. 13.

The surface layer 11 used may also be a ductile layer, for example of a metallic material, such as for example nickel or cobalt, which has been applied, for example, by electroplating or by cold gas spraying. In particular these coating methods do not produce good chemical bonding between the surface layer 11 and the substrate 3, since the electroplating process takes place at very low temperatures and the cold gas spraying may even be carried out at room temperature.

A heat treatment of an electroplated layer or of a layer 11 which has been applied by cold gas spraying can be carried out in order, for example, to increase the cohesion of the layer 11 if necessary.

Layers applied in this way can easily be removed by blasting with dry ice or using an acid or acid mixtures specifically matched to the element, without the substrate 3 being attacked as a result.

The invention being thus described, it will be obvious that the same may be varied in many ways. Such variations are not to be regarded as a departure from the spirit and scope of the invention, and all such modifications would be obvious to one skilled in the art intended to be included within the scope of the following claims.

The invention claimed is:

1. A method for refurbishing a gas turbine blade made from a textured superalloy body coated with a protective coating, the method comprising the steps of:
    coating a surface of said body with a high temperature stable surface coating, thereby covering said protective coating;
    restoring the microstructure of the superalloy body by performing a solution heat treatment on the body, thereby maintaining said thermally stable surface coating;
    removing jointly said surface coating and said protective coating; and
    providing a second protective coating on said body.

2. The method according to claim 1,
    wherein a γ-phase and a γ'-phase are present in said superalloy and wherein the temperature of said solution heat treatment is at least the solution temperature of the γ' phase.

3. The method according to claim 1,
    wherein said solution heat treatment is performed with a temperature above 1100° C.

4. A method for refurbishing a gas turbine blade made from a textured superalloy body coated with a protective coating, the method comprising the steps of:
    removing the protective coating;
    coating a surface of said body with a high temperature stable surface coating;
    restoring the microstructure of the superalloy body by performing a solution heat treatment on said body, thereby maintaining said thermally stable surface coating;
    removing the surface coating; and
    providing a second protective coating on said body.

5. The method according to claim 4,
    wherein a γ-phase and a γ'-phase are present in the superalloy and wherein the temperature of said solution heat treatment is at least a solution temperature of the γ'-phase.

6. The method according to claim 4,
    wherein said solution heat treatment is performed with a temperature above 1100° C.

7. The method according to claim 1 or 4,
    wherein the textured article is a single crystal article.

8. The method according to claim 1 or 4,
    wherein the textured article is a directionally solidified article.

9. The method according to claim, 1 or 4,
    wherein said surface is applied with an appropriate surface coating.

10. The method according to claim, 1 or 4,
    wherein the surface layer is applied to a region which has been newly built up, in particular has been produced by build-up welding.

11. The method according to claim 1 or 4,
    wherein the surface layer is applied to a region which surrounds a repaired crack.

12. The method according to claim 1 or 4,
    wherein a metallic surface layer, in particular of nickel or cobalt is used.

13. The method according to claim 12,
    wherein the metallic layer is applied by electroplating.

14. The method according to claim 13,
    wherein the surface layer is removed by means of an acid treatment.

15. The method according to claim 12,
    wherein the surface layer is applied by cold gas spraying.

16. The method according to claim 12,
    wherein the surface layer is removed by means of an acid treatment.

17. A method for refurbishing a gas turbine blade made from a textured superalloy body coated with a protective coating, the method comprising the steps of:
    coating a surface of said body with a high temperature stable surface coating, thereby covering said protective coating;
    performing a solution heat treatment on the body wherein a γ-phase and a γ'-phase are present in said superalloy and wherein the temperature of said solution heat treatment is at least the solution temperature of the γ' phase, thereby maintaining said thermally stable surface coating;
    removing jointly said surface coating and said protective coating; and
    providing a second protective coating on said body, wherein grain recrystallization is suppressed by providing bulk conditions which assure a higher temperature threshold for grain recrystallization.

18. A method for refurbishing a gas turbine blade made from a textured superalloy body coated with a protective coating, the method comprising the steps of:
    removing the protective coating;
    coating a surface of said body with a high temperature stable surface coating;
    performing a solution heat treatment on said body wherein a γ-phase and a γ' phase are present in the superalloy and wherein the temperature of said solution heat treatment is at least a solution temperature of the γ'-phase, thereby maintaining said thermally stable surface coating;
    removing the surface coating; and
    providing a second protective coating on said body, wherein grain recrystallization is suppressed by covering areas with said surface coating.

19. A method for recovering texture of a textured article which is made from a superalloy, comprising the steps of:
    creating on a surface of the article a high temperature stable surface coating; and
    performing a solution heat treatment on said article wherein a γ-phase and a γ'-phase are present in said superalloy and wherein the temperature of said solution heat treatment is at least the solution temperature of the γ'-phase, thereby maintaining said thermally stable surface coating, restoring the microstructure of the textured article, and suppressing grain recrystallization by providing bulk conditions which assure a higher temperature threshold for grain recrystallization.

20. The method according to claim 19, wherein said article is a gas turbine component.

21. The method according to claim 20, wherein said gas turbine component is a blade or a vane.

22. The method according to claim 19, wherein said superalloy is cobalt-based with precipitations or carbides that provide a strengthening mechanism similar to a γ-phase in Nickel based alloys.

* * * * *